United States Patent

Kobayashi et al.

[11] Patent Number: 4,909,604
[45] Date of Patent: Mar. 20, 1990

[54] LIGHT SOURCE DEVICE

[75] Inventors: Akira Kobayashi; Tooru Sano, both of Mobara, Japan

[73] Assignee: Hitachi, Ltd., Tokyo, Japan

[21] Appl. No.: 235,097

[22] Filed: Aug. 23, 1988

[30] Foreign Application Priority Data

Aug. 28, 1987 [JP] Japan .................. 62-214718

[51] Int. Cl.$^4$ .................. G02F 1/13; F21V 7/04
[52] U.S. Cl. .................. 350/345; 362/31; 362/347
[58] Field of Search .................. 350/345, 360, 334; 362/31, 32, 26, 347, 297

[56] References Cited

U.S. PATENT DOCUMENTS

| | | | |
|---|---|---|---|
| 3,653,138 | 4/1972 | Cooper | 350/345 |
| 4,059,916 | 11/1977 | Tachihara et al. | 350/345 |
| 4,487,481 | 12/1984 | Suzawa | 350/345 |
| 4,630,895 | 12/1986 | Abdala, Jr. et al. | 350/345 |
| 4,641,925 | 2/1987 | Gasparaitis et al. | 350/345 |
| 4,706,173 | 11/1987 | Hamada et al. | 350/345 |

FOREIGN PATENT DOCUMENTS

83/03013  9/1983  PCT Int'l Appl. .................. 350/345

*Primary Examiner*—Stanley D. Miller
*Assistant Examiner*—Napoleon Thantu
*Attorney, Agent, or Firm*—Antonelli, Terry & Wands

[57] ABSTRACT

A light source device has a transparent plate having a smoothened front surface and a roughened rear surface. A light source is disposed adjacent to an end face of the transparent plate. The roughened rear surface has a portion which is inclined and curved and disposed adjacent to the end of the transparent plate remote from the light source. A reflecting plate is disposed adjacent to and extends along the roughened rear surface of the transparent plate. The provision of the inclined and curved surface portion assures that the luminance of the light on the smoothened front surface of the transparent plate is substantially uniform over the entire surface area. The inclined and curved surface portion is represented by the following equation, $$y = H - (H-h)x^n/L^n$$

where
y is a distance from the smoothened front surface,
x is a distance from the light source,
L is a length of the transparent plate,
H is the value of y at the end face of the transparent plate,
h is the value of y at x being L, and
n is an arbitrary positive number larger than unity, and
wherein the height of the light source is substantially the same as H.

10 Claims, 8 Drawing Sheets

LIGHT SOURCE DEVICE

BACKGROUND OF THE INVENTION

The present invention relates to a light source device which can be used with a liquid crystal display device which requires a flat or planar illuminator.

Some liquid crystal display devices of the time-multiplexed drive type or active matrix type (for example, thin film transistor type) are of the back light type that has a light source disposed on the backside of a liquid crystal display panel to display a clear and bright image thereon.

The illuminator for the liquid crystal display device of the type referred to above may be formed by the light source device disclosed in U.S. Pat. No. 4,059,916. The light source device includes a transparent plate corresponding in size to an associated liquid crystal display panel and a light source disposed adjacent to an end face of the transparent plate. The light source device is characterised in that it utilizes the light source disposed adjacent to the one end face of the transparent plate to provide a uniform surface illumination over a wide area. The illuminator is also characterised in that, because the light source is disposed adjacent to the one end face of the transparent plate, the thickness of the transparent plate can be reduced to insure reduction in the thickness of the illuminator. This is especially advantageous in the case where the illuminator is used with the liquid crystal display device which is inherently required to be of a reduced thickness. The transparent plate is made of a material having a good light transmission characteristic and has a smooth front surface adjacent to the liquid crystal display panel and a rough rear surface which is designed not only to diffuse the light from a light source, but also to reflect the light from the light source to the smooth front surface. The roughened rear surface of the transparent plate has a portion which is beyond a predetermined distance from the end of the transparent plate adjacent to the light source and which is inclined relative to the smooth front surface so that the thickness of the transparent plate is gradually reduced toward the other end of the transparent plate. The inclined surface portion of the roughened rear surface is intended to positively reflect the light from the light source to the smooth front surface so as to compensate for the attenuation of the light which passes through the transparent plate. In other words, the inclined surface portion is designed to prevent reduction in the luminance of the light reflected to the portion of the front surface remote from the light source to insure a uniform luminance of the light over the entire surface area of the front surface.

From the basic research of light source devices in the course of the development of liquid crystal display devices, the inventors have learned that the provision of the inclined surface portion in the roughened rear surface of the transparent plate is insufficient to prevent the reduction in the luminance of the light reflected to the portion of the front surface remote from the light source. From the study by the inventors, it has been found that the inclined surface portion of the roughened rear surface directly reflects the weak light which has been attenuated towards the end of the transparent plate remote from the light source, so that the uniformity of the luminance of the light on the smoothened front surface of the transparent plate is lowered with a resultant disadvantageous reduction in the uniformity of the luminance of the light on the liquid crystal display panel of the liquid crystal display device. This disadvantage is particularly true with the case of large-size liquid crystal display devices.

SUMMARY OF THE INVENTION

It is an object of the present invention to provide a light source device of the type which has a light source disposed adjacent to an end of a transparent plate and which exhibits an improved uniformity of the luminance of the light on the front surface of the transparent plate.

It is another object of the present invention to provide a light source device of the type specified above and which is improved to decrease the reduction in the luminance of the light on the smooth front surface of the transparent plate towards the end thereof remote from the light source to the extent that the reduction in the luminance does not raise any practical problems.

It is a further object of the present invention to provide a device which achieves the above objects and which is capable of assuring improved brightness of a clear image displayed on a liquid crystal display device.

The light source device according to the present invention is of the type which includes a light source disposed adjacent to an end face of a transparent plate and in which the transparent plate has a rear surface which is continuously inclined and curved so as to limit, to a level within a certain range, the reduction in the quantity of the light per unit of area on the front surface of the transparent plate which reduction would otherwise be of a substantial level in a zone of the front surface remote from the light source. The term "front surface" is used herein to mean the surface of the transparent plate which is to be adjacent to an observer, that is a liquid crystal display device, while the term "rear surface" means the surface of the transparent plate which is opposite to the front surface.

The provision of the continuously inclined and curved rear surface on the transparent plate advantageously decreases the attenuation of the light towards the end of the transparent plate remote from the light source. This minimizes the reduction in the luminance of the light on the zone of the smooth front surface of the transparent plate remote from the light source, to thereby provide a substantially uniform surface illuminator.

In addition, the light source device of the present invention can be utilized in a liquid crystal display device to advantageously improve the brightness and resolution of a liquid crystal display image on a liquid crystal display panel.

The above and other objects, features and advantages of the present invention will become more apparent from the following description with reference to the accompanying drawings.

DETAILED DESCRIPTION OF PREFERRED EMBODIMENTS

Figure 1:
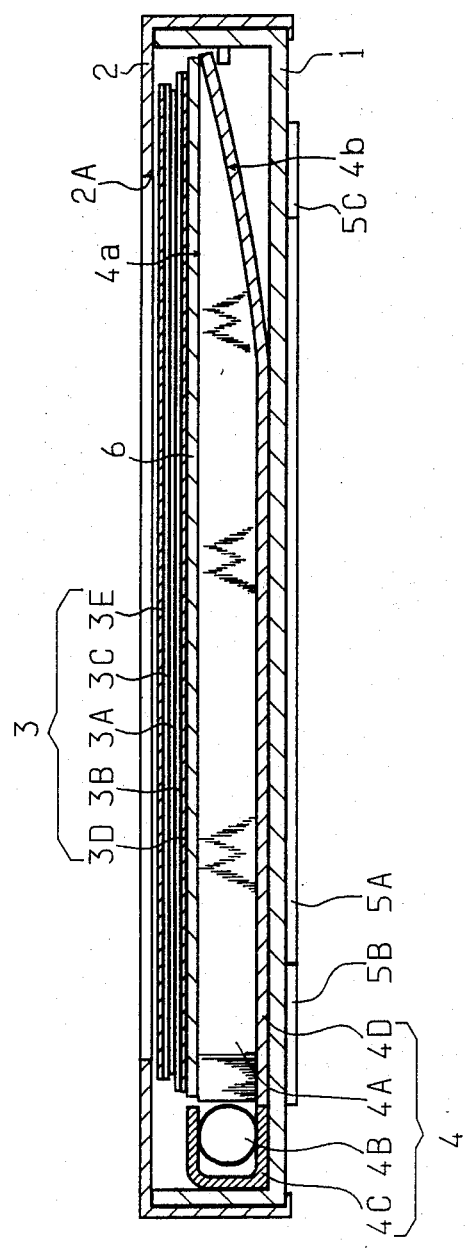
FIG. 1 is a cross-sectional view of a first embodiment of a liquid crystal display device and its light source device according to the present invention.
Figure 2:
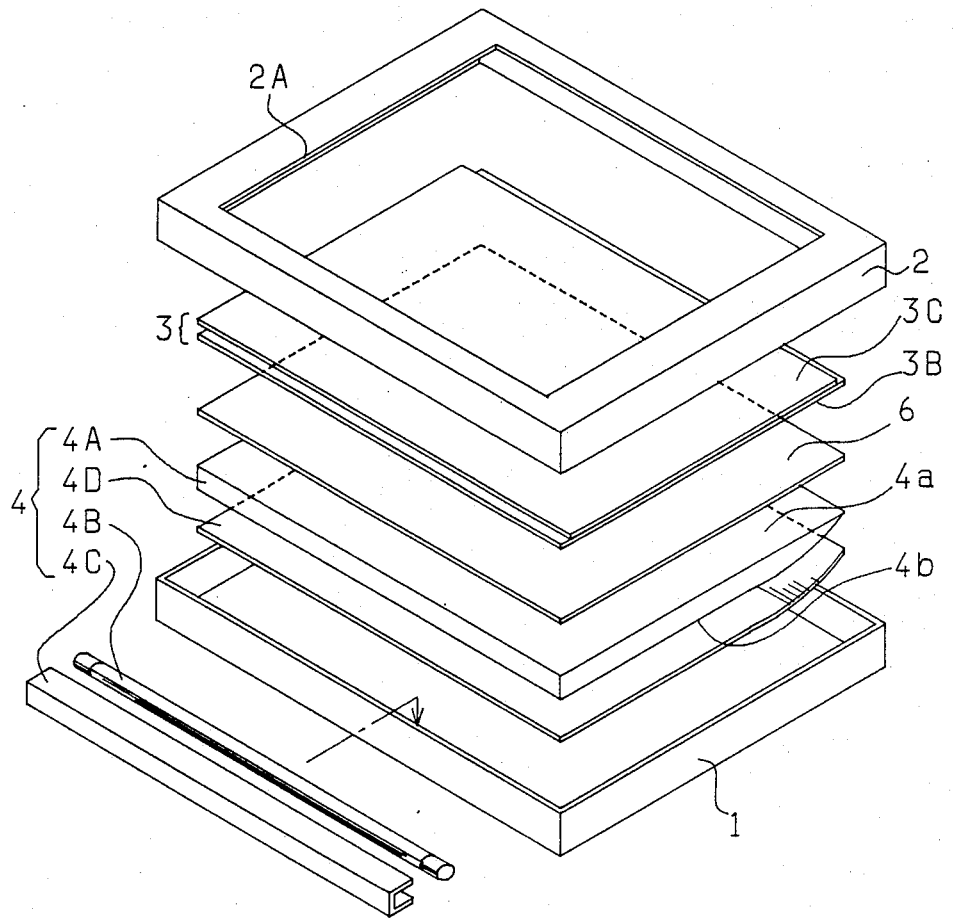
FIG. 2 is an exploded perspective view of the liquid crystal display device and light source device shown in FIG. 1.

Referring first to FIGS. 1 and 2, a liquid crystal display device and its illuminator or light source device include a lower frame 1, an upper frame or cover 2 which cooperates with the lower frame 1 to define an interior space which accommodates a liquid crystal display panel 3 and a light source device or illuminator 4.

The lower frame 1 is generally rectangular and made of a molded plastic material. The upper frame 2 is also generally rectangular and snugly fitted over the lower frame 1. The upper frame 2 is provided with a central opening 2A which is designed to expose the liquid crystal display panel 3. The upper frame 2 may preferably be made of either a metal such as iron or aluminium alloy, or a plastic material.

While the structural details of the liquid crystal display panel 3 are not shown, the liquid crystal display panel 3 is of a conventional structure and it will be sufficient to note that the panel is either of the type that is provided with dot matrix electrodes and driven with time multiplexing, or of the type that is driven with built-in thin film transistors. The liquid crystal display panel 3 comprises a lower transparent glass substrate 3B, an upper transparent glass substrate 3C and liquid crystal 3A sealed in a space defined between the orientation surfaces formed on the opposite inner surfaces of the lower and upper transparent glass substrates 3B and 3C. The liquid crystal 3A is of the twisted nematic type as disclosed in U.S. Pat. No. 3,918,796. The display by the liquid crystal 3A is controlled by scanning electrodes provided on the inner surface of the lower transparent glass substrate 3B and segment electrodes provided on the inner surface of the upper transparent glass substrate 3C. First and second polarizing plates 3D and 3E are disposed on the outer surfaces of the lower and upper transparent glass substrates 3B and 3C, respectively.

Figure 3:
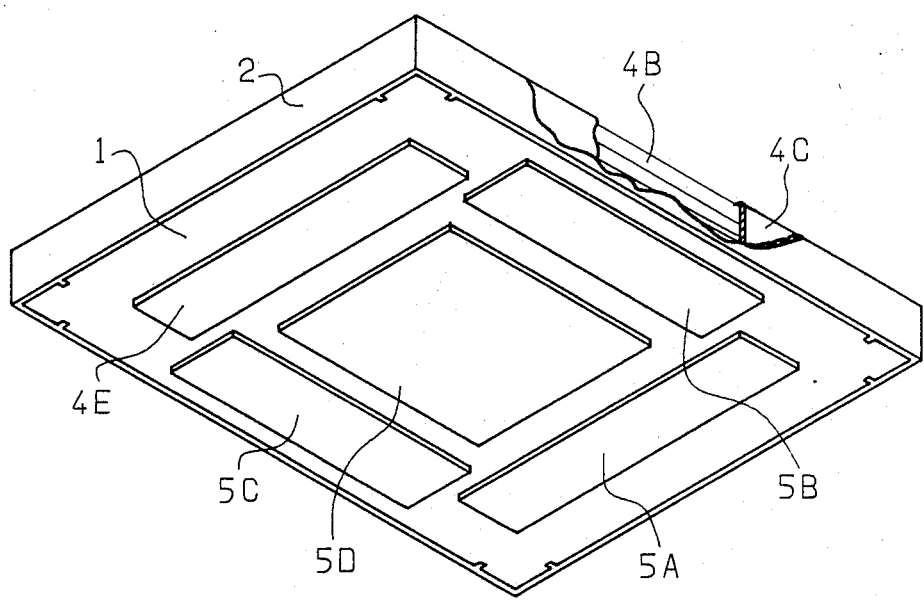
FIG. 3 is a perspective view of the liquid crystal display device as viewed from the bottom side thereof.

The segment electrodes are driven by segment driver circuits 5B and 5C, respectively, detachably mounted on the bottom of the lower frame 1, as shown in FIG. 3. In the embodiment of the invention, the segment electrodes are divided into upper and lower segments which are respectively driven by the two segment driver circuits 5B and 5C. Each of the segment driver circuits 5B and 5C is formed on a circuit board of, for example, glass epoxy resin and comprise semiconductor integrated circuits.

The scanning electrodes are driven by a common electrode driver circuit 5A detachably mounted on the bottom of the lower frame 1. The common electrode driver circuit 5A is formed on a circuit board and comprises semiconductor integrated circuits as in the case of the segment driver circuits 5B and 5C.

The segment electrode driver circuits 5B and 5C and the common electrode driver circuit 5A are each driven by a liquid crystal driver circuit 5D which is formed on a circuit board and comprises a semiconductor integrated circuit.

As shown in FIGS. 1-3, the light source device or illuminator 4 is formed chiefly by a transparent plate 4A, a light source 4B, a first reflector 4C for the light source, a second reflecting plate 4D for the transparent plate 4A and an inverter power source circuit 4E.

Figure 4:
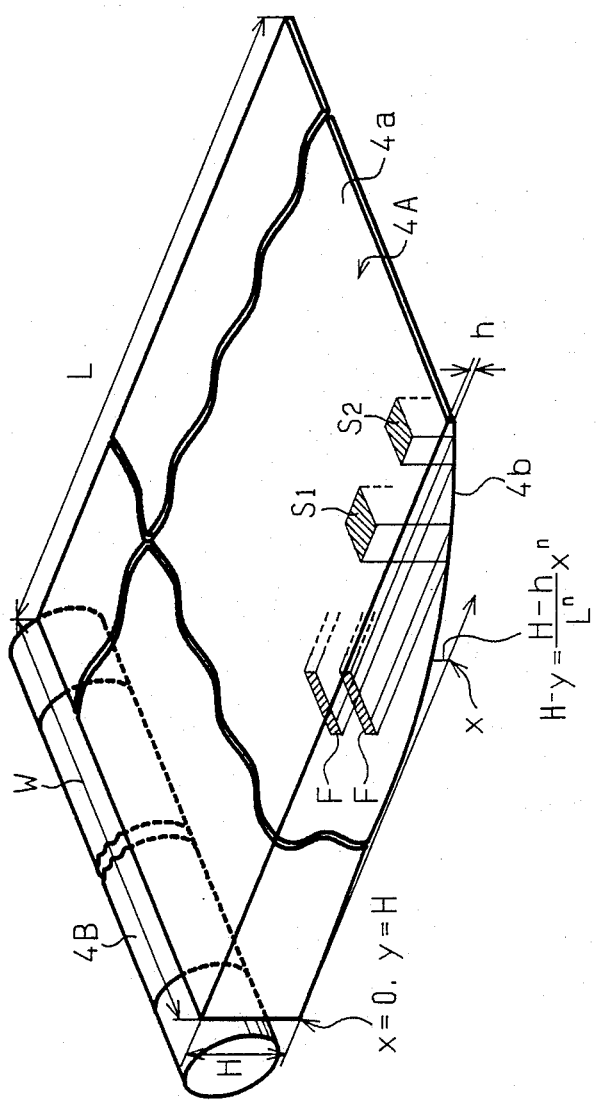
FIG. 4 is a perspective view of a transparent plate of the light source device.

As shown in FIG. 4, the transparent plate 4A is made of a generally rectangular transparent material having a good light transmission characteristic, such as an acrylic resin which has a light transmission as high as from 90 to 95%. The transparent plate 4A may alternatively be made of transparent glass. In the illustrated embodiment of the invention, the transparent plate 4A has a widthwise dimension W of 250 mm (as measured in the axial direction of the light source 4B), a longitudinal dimension L of 160 mm and a thickness H of from 5 to 15 mm. The longitudinal dimension L may alternatively be 110 mm.

Figure 5:
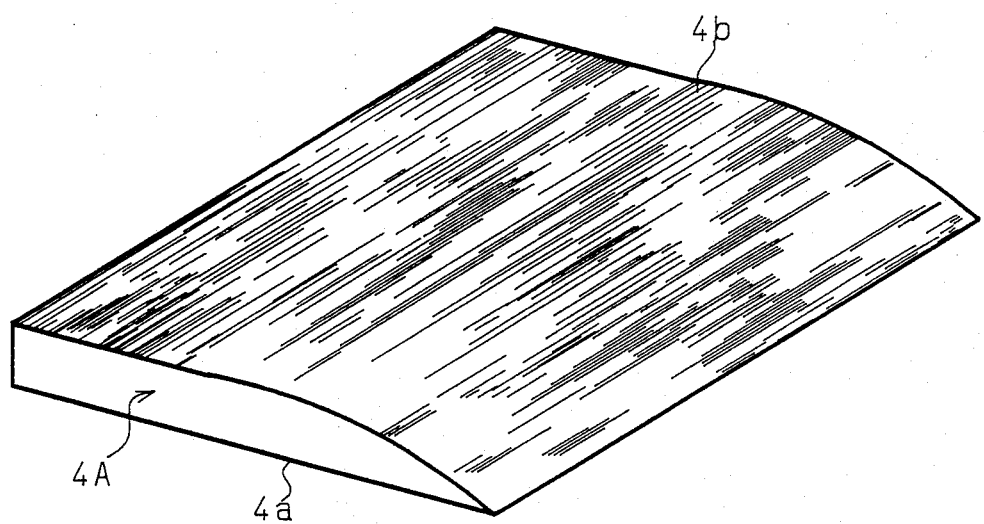
FIG. 5 is a perspective of the inverted transparent plate.

The surface of the transparent plate 4A to be adjacent to the liquid crystal display panel 3 is formed by a smoothened surface 4a. The opposite surface of the transparent plate 4A is formed by a roughened surface 4b rougher than the surface 4A, as shown in FIG. 5. The roughened surface 4b has a surface roughness substantially equal to a surface roughened by emery-paper, for example, of from No. 50 to No. 200. The roughened surface 4b is formed thereon with elongated and substantially parallel scratches which extend substantially in parallel with the longitudinal axis of the light source 4B. Compared with the case where the scratches extend perpendicularly to the longitudinal axis of the light source, the scratches parallel to the light source axis advantageously provide desired coefficients of light diffusion and light reflection.

As shown in FIGS. 1 and 4, the roughened surface 4b of the transparent plate 4A is formed by a continuously inclined and curved surface which is effective to assure that the quantity of the light reflected to the portion of the smoothened surface 4a of the transparent plate 4A remote from the light source is not substantially decreased even if the distance x of the surface portion from the light source is increased. In other words, the continuosly inclined and curved surface is arranged so that the transparent plate 4A has a thickness which is decreased (from a dimension H to a dimension h) towards the end of the transparent plate 4A remote from the light source 4B. The inclined and curved surface is represented by:

$$y = H - (H-h)x^n/L^n$$

where y is a distance in the direction of H from the smoothened surface 4a, x is a distance in the direction of L from the light source 4B, and n is preferably 3 to 4 for L of 160 mm, and is preferably from 2 to 3 for L of 110 mm.

The light source device 4 is operative to insure a substantially uniform luminance of the light on the smoothened front surface 4b of the transparent plate 4A because the inclined and curved surface of the roughened rear surface of the transparent plate 4A is operative to exhibit a reflection directivity to compensate for the attenuation of the light increasing towards the end of the transparent plate 4A remote from the light source 4B.

As shown in FIG. 4, when a quantity of light F from the light source 4B is reflected from the roughened rear surface 4b of the transparent plate 4A onto the smoothened front surface 4a at a first portion thereof spaced by a first predetermined distance from the light source 4B, the quantity of the reflected light per unit area of the smoothened front surface 4a can be represented by $F/S_1$ provided that the absorption and diffuse reflection of light by the transparent plate 4A are neglected. Similarly, when a quantity of light F from the light source 4B is reflected from the roughened rear surface 4b onto the smoothened front surface 4a at a second portion thereof which is further spaced a second distance from the light source 4B, the quantity of the reflected light per unit area of the front surface 4a can be represented by $F/S_2$. In other words, the inclined and curved surface of the roughened rear surface 4b of the transparent plate 4A is arranged to provide a reflection characteristic which compensates for the reduction in the quantity of light increasing towards the end of the transparent plate 4A remote from the light source 4B to assure that the quantity of light per unit area of the smoothened front surface 4a is substantially uniform over the front surface 4a. The light source device 4 described above, therefore, suffers from a minimized reduction in the luminance of the smoothened front surface 4a at points thereon remote from the light source 4B and, accordingly, can provide a uniform surface illuminator.

Figure 6:
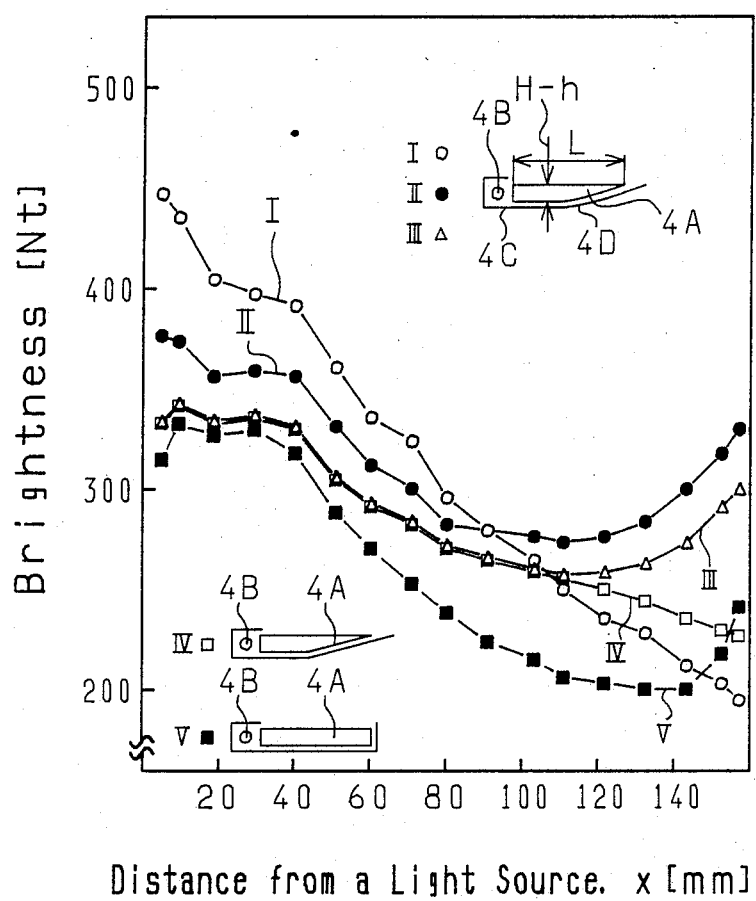
FIGS. 6 and 7 show the relationship between the distance from the light source and the luminance of the light in the light source device.
Figure 7:
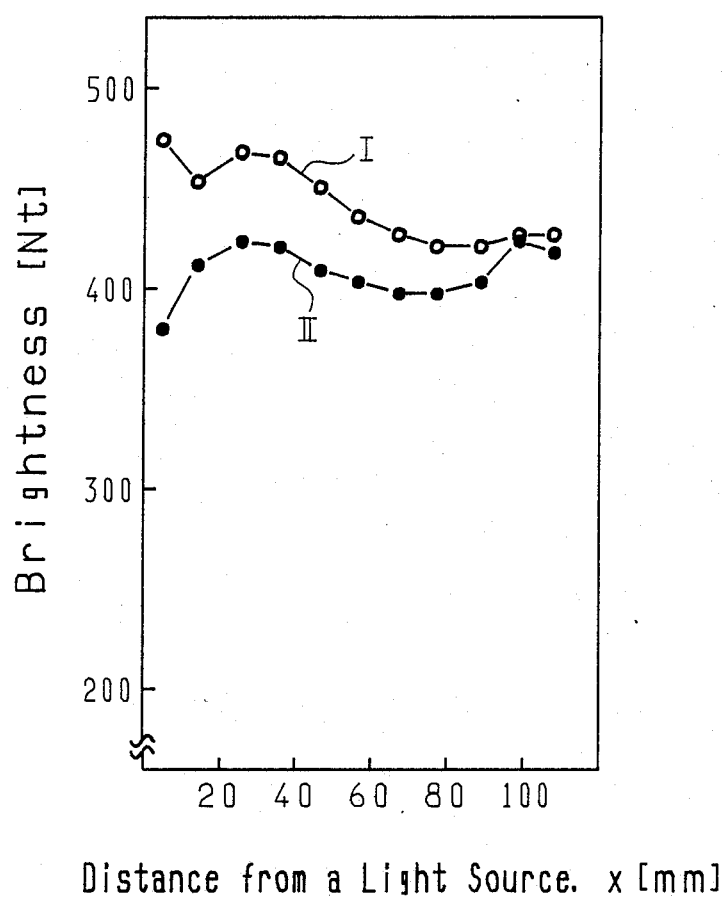

FIGS. 6 and 7 graphically show data obtained by the inventors. More specifically, FIG. 6 shows a relationship between a distance x from the light source 4B and the luminance (Nt) which relationship is obtained from a test conducted on light source devices having transparent plates 4A of a dimension L of 160 mm, a dimension H of 13 mm and a dimension W of 250 mm. The data I, II and III are obtained from the transparent plates 4A having the roughened rear surface 4b provided with inclined and curved surfaces, the index n in the above equation being 2, 3, and 4, respectively. It will be apparent from FIG. 6 that, in the cases where the dimension L of the transparent plate 4A is 160 mm, the indexes n of 3 and 4, which correspond to the data II and III, respectively, are most appropriate for the inclined and curved surface of the roughened surface 4b of the transparent plate 4A.

The data IV shown in FIG. 6 are obtained from a transparent plate 4A in which a roughened rear surface is linearly curved in a portion beyond a predetermined distance from the light source 4B. It will be apparent from the data IV that the luminance of the light on the smoothened front surface of the transparent plate 4A is reduced in a portion remote from the light source 4B. The data V shown in FIG. 6 is obtained from a transparent plate 4A in which the roughened rear surface is parallel to the smoothened front surface. It will be seen from the data V that the luminance of the light on the smoothened front surface is gradually decreased with the increase in the distance from the light source 4B and that, at the zone which is most remote from the light source 4B, the reflecting plate 4D for the transparent plate 4A slightly compensates for the decrease in the luminance of the light.

It will be understood from the foregoing description that the provision of the continuously inclined and curved surface on the roughened rear surface 4b of the transparent plate 4A is effective to reduce the decrease in the luminance of light in the portion of the front surface of the transparent plate 4A remote from the light source 4B to thereby advantageously improve the uniformity of the luminance.

FIG. 7 shows the relationship between the distance x from the light source 4B and the luminance of light obtained from a test conducted on light source devices having transparent plates 4A each having a dimension L of 110 mm, a dimension H of 10 mm and a dimension W of 250 mm. The data I and II shown in FIG. 7 are obtained from the transparent plates 4A which fall within the scope of the present invention and have inclined and curved roughened rear surfaces. The data I is for the case of the index of the above-mentioned equation, n being 2, while the data II are for the index n being 3. It will be apparent from FIG. 7 that, in the case where the dimension L of the transparent plate 4A is 110 mm, the index n of 2 or 3, which corresponds to the data I or II, respectively, is most appropriate for the inclined and curved surface of the roughened rear surface 4b of the transparent plate 4A.

The light source device 4 when incorporated into a liquid crystal display device is effective to obtain a clear and well-defined image on the liquid crystal display panel 3. If variation in the luminance on the display surface of the liquid crystal display panel is continuous and less than 30%, it does not raise any practical problems.

The light source 4B is disposed adjacent to one end face of the transparent plate 4A. The light source 4B may preferably be formed by a cold cathode fluorescent lamp of, for example, 250 mm in length which is driven by the inverter power source circuit 4E mounted on the bottom of the lower frame 1. The inverter power source circuit 4E is designed to convert a direct electric voltage of from 5 to 24 V to an alternating voltage of from 300 to 400 V and 30 KHz. The inverter power source circuit 4E is formed on a circuit board and comprises a semiconductor device, as in the cases of the circuits 5A-5D.

The reflector 4C for the light source 4B is of a substantially squarish U-shaped cross section which surrounds the light source 4B except an exit part thereof so as to assure that the light of the light source 4B can be efficiently reflected towards the transparent plate 4A. This reflector 4C is formed by a sheet of aluminium and has a surface which is directed towards the light source, the surface being coated with a white paint (preferably of an acrylic resin).

The reflecting plate 4D for the transparent plate 4A is so shaped as to extend in intimate contact with the roughened rear surface 4b of the transparent plate 4A to assure that the light from the light source 4B can be efficiently reflected towards the smoothened front surface of the transparent plate 4A and thus the liquid crystal display panel 3. The reflecting plate 4D may also be formed by a material the same as or similar to the material by which the reflector 4C for the light source 4B is formed.

A light diffusing plate 6 is disposed between the liquid crystal display panel 3 and the transparent plate 4A of the light source device 4. The light diffusing plate 6 may preferably be formed by a translucent acrylic resin having a light transmission coefficient of about 85%. The light diffusing plate 6 has a thickness of from 0.5 to 3.0 mm.

The roughened rear surface of the transparent plate 4A of the light source device 4 of the present invention may be modified so that the continuously inclined and curved surface extends towards the end of the transparent plate 4A remote from the light source 4B, starting from a point which is spaced by a predetermined distance from the light source 4B. The modified transparent plate 4A is operative to provide an advantage similar to that of the embodiment described above.

The roughened surface 4b provided on the surface of the transparent plate 4A to be adjacent to the reflecting plate 4D for the transparent plate 4A may be omitted and the effect provided by the roughened surface 4b may alternatively be obtained by modifying the reflecting surface of the reflecting plate 4D.

The smoothened front surface 4a of the transparent plate 4A of the light source device or illuminator 4 may alternatively be formed by a curved concave surface, rather than a planar surface.

The light source device 4 may also be modified so that the reflecting plate 4D be replaced by a large number of light transmissive beads disposed in side-by-side relationship, although this modification increases the cost of manufacture to a certain extent. In this modification, moreover, the light diffusing plate 6 may be omitted and, in addition, the rear surface 4b of the transparent plate 4A may be smoothened, rather than being roughened.

The light source 4B of the light source device 4 may alternatively be formed by a hot cathode fluorescent lamp. In addition, in the case where the light source 4B is of a small size, it may be formed by a plurality of LEDs.

Figure 8:
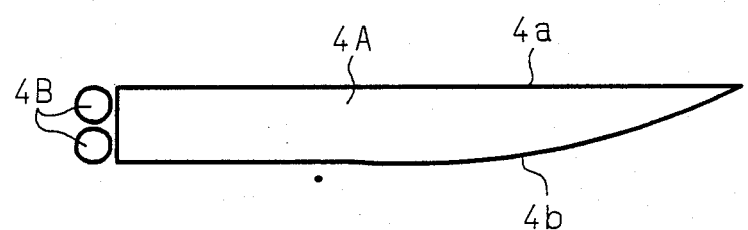
FIGS. 8-10 schematically show other embodiments of the light source device according to the present invention.
Figure 9:
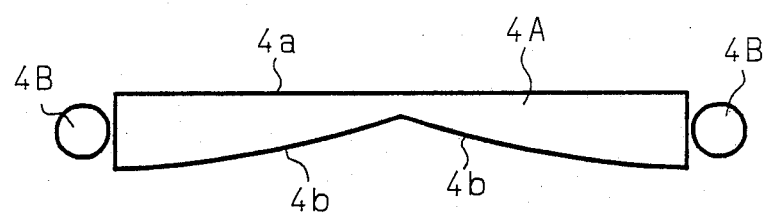
Figure 10:
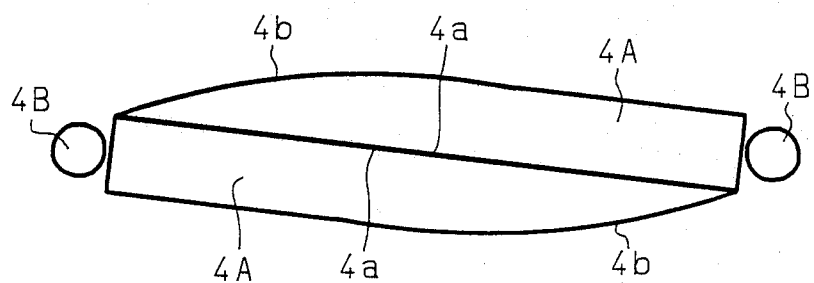

FIGS. 8 through 10 show modifications to the light source device described hereinabove.

The modified light source device 4 shown in FIG. 8 has a plurality of light sources 4B disposed adjacent to one end of the transparent plate 4A. Due to the provision of a plurality of light sources 4B, the light source device 4 provides an increased luminance.

The light source device 4 shown in FIG. 9 is modified so that light sources 4B are provided adjacent to the opposite end faces of the transparent plate 4A and that the roughened rear side of the transparent plate 4A is provided with a pair of inclined and curved surfaces 4b which are joined or connected together at the point most remote from the light sources 4B so that the transparent plate 4A is thinnest at its central portion. The provision of a plurality of light sources 4B increases the luminance of the light source device 4.

The light source device 4 shown in FIG. 10 comprises a pair of transparent plates 4A assembled so that the smoothened surfaces 4a contact with each other. Light sources 4B are disposed adjacent to the opposite ends of the assembly of the two transparent plates 4A. The light source device 4 thus formed provides an increased luminance and, in addition, is advantageous in that the lights from the respective light sources 4B eliminate directivities caused by the roughened surfaces 4b.

Since the light source devices 4 described above provide improved luminance, these light source devices are suited for use with the liquid crystal display device of the type that employs a liquid crystal display panel 3 of the super twisted nematic type for display in white and black mode which light transmission coefficient is low.

The present invention is not limited to the embodiments described hereinabove and may be modified within the essential spirit of the invention. For example, the present invention can be applied to light source device for a liquid crystal display device of the active matrix type in which each picture element has a thin film transistor and a transparent picture element electrode.

The application of the present invention is not limited to liquid crystal display devices. The light source devices of the present invention can be used with various other devices which employ flat illuminators, such as watches, meters and so forth.

In summary, the present invention provides an advantage that the luminance of the flat light source devices can be made substantially uniform over the entire surface area.

What is claimed is:

1. A light source device including a transparent plate having a first transparent surface, a reflecting plate disposed adjacent to a second surface of said transparent plate opposite to said first transparent surface, and at least one light source disposed adjacent to an end face of said transparent plate, wherein said second surface of said transparent plate includes a surface portion which is inclined and curved, said inclined and curved surface portion being represented by the following equation, $$[y=(H-h)x^n/L^n]y=H-(H-h)x^n/L^n$$

where
y is a distance from said first transparent surface,
x is a distance from said at least one light source,
L is a length of said transparent plate,
H is the value of y at said end face of said transparent plate,
h is the value of y at x being L, and
n is an arbitrary positive number larger than unity, and wherein a height of said at least one light source is substantially the same as H.

2. A light source device according to claim 1, wherein said transparent plate is made of a material selected from a group including at least one of a transparent acrylic resin and transparent glass.

3. A light source device according to claim 1, wherein said light source is formed by one of a cold cathode fluorescent lamp, a hot cathode fluorescent lamp and LEDs.

4. A light source device according to claim 1, wherein said first transparent surface of said transparent plate is adjacent to a liquid crystal panel of a liquid crystal display device.

5. A light source device according to claim 4, wherein a light diffusing plate is interposed between said first transparent surface and said liquid crystal display panel.

6. A light source device according to claim 1, wherein a plurality of light sources are disposed adjacent to one end face of said transparent plate.

7. A light source device according to claim 1, wherein at least one additional light source is disposed adjacent to the other end face of said transparent plate and wherein said second surface of said transparent plate is formed by an inclined and curved surface portion which is arranged so that said transparent plate is thinnest at a central point which is most remote from said at least one light source and said at least one additional light source, said inclined and curved surface portion being substantially represented by the equations, $$y = H - (H-h)x^n/(L/2)^n \text{ for } 0 \leqslant x \leqslant L/a$$

$$y = H - (H-h)(L-x)^n/(L/2)^n \text{ for } L/a \leqslant x \leqslant L$$

where
- y is a distance from said first transparent surface,
- x is a distance from said at least one light source,
- L is a length of said transparent plate,
- H is the value of y at said two end faces of said transparent plate,
- h is the value of y at the center, and
- n is an arbitrary positive number larger than unity.

8. A light source device according to claim 1, further including an additional transparent plate associated with said first transparent plate so that the two transparent plates are stacked with the first transparent surface of said first transparent plate being in contact with a transparent surface of said additional transparent plate, said second surface of said first transparent plate being disposed on said reflecting plate and a second surface of said additional transparent plate being adjacent to a liquid crystal display panel of a liquid crystal display device, and wherein the assembly of said two transparent plates has opposite ends respectively associated with a light source.

9. A light source device according to claim 1, wherein said inclined and curved surface portion includes means for exhibiting a reflection directivity, said means for exhibiting enabling said inclined and curved surface portion to compensate for attenuation of light increasing towards an end of said transparent plate remote from said at least one light source, thereby providing a substantially uniform surface illuminator.

10. A light source device according to claim 1, wherein said end face of said transparent plate is a planar surface.

* * * * *

UNITED STATES PATENT AND TRADEMARK OFFICE
CERTIFICATE OF CORRECTION

PATENT NO. : 4,909,604
DATED : March 20, 1990
INVENTOR(S) : KOBAYASHI et al

It is certified that error appears in the above-identified patent and that said Letters Patent is hereby corrected as shown below:

Column 8, line 25 (Claim 1), delete

"$[y=(H-h)x^n/L^n]y=H-(H-h)x^n/L^n$" and insert

-- $y=H-(H-h)x^n/L^n$ --

Signed and Sealed this

Sixteenth Day of June, 1992

*Attest:*

DOUGLAS B. COMER

*Attesting Officer*     *Acting Commissioner of Patents and Trademarks*